United States Patent [19]
Park

[11] Patent Number: 5,886,805
[45] Date of Patent: Mar. 23, 1999

[54] OPTICAL SCANNING DEVICE AND A SYNCHRONIZING SIGNAL DETECTING METHOD THEREOF

[75] Inventor: Chang Jin Park, Kyunggi-do, Rep. of Korea

[73] Assignee: Samsung Electro-Mechanics Co., Ltd., Suwon, Rep. of Korea

[21] Appl. No.: 938,218

[22] Filed: Sep. 26, 1997

[30] Foreign Application Priority Data

Nov. 30, 1996 [KR] Rep. of Korea ............... 1996-60381

[51] Int. Cl.$^6$ ................................. G02B 26/08
[52] U.S. Cl. .................... 359/196; 359/216; 250/236
[58] Field of Search ........................ 359/618, 196, 359/216, 217, 218, 219; 250/234, 235, 236

[56] References Cited

U.S. PATENT DOCUMENTS

| 4,950,888 | 8/1990 | Hamada | 250/236 |
| 5,532,866 | 7/1996 | Shibata et al. | 359/216 |
| 5,694,236 | 12/1997 | Sekikawa | 359/217 |

*Primary Examiner*—Loha Ben
*Attorney, Agent, or Firm*—Ladas & Parry

[57] ABSTRACT

An optical scanning device and synchronizing signal detecting method, in which beams before or after an effective scanning width are identically reflected in an opposite direction of a scanning path upon being incident to a reflection unit to return to a light source unit via a focal unit and a deflection unit and signal change is induced within the light source unit upon the return of the beams, thereby detecting a synchronizing signal according to the signal change to simplifying the construction. The optical device includes the light source unit having a laser diode for radiating the beams and a photodiode for detecting the beams output, the deflection unit for deflecting the beams outgoing from the light source unit by a regular angle of view, and the focal unit for converging the beams outgoing from the deflection unit and scanning them onto a photosensitive drum. Also, a detection unit reflects the beams before or after an effective scanning width among the beams scanning the photosensitive drum in the direction opposite to the scanning path to supply them to the light source unit, and a synchronizing signal generating part detects a synchronizing signal when the photodiode induces the signal change by the beams reflected to the light source unit.

5 Claims, 6 Drawing Sheets

OPTICAL SCANNING DEVICE AND A SYNCHRONIZING SIGNAL DETECTING METHOD THEREOF

BACKGROUND OF THE INVENTION

1. Field of the Invention

The present invention relates to an optical scanning device and synchronizing signal detecting method thereof, and more particularly to an optical scanning device and synchronizing signal detecting method thereof, wherein beams scanning during a procedure of converging the beams radiated from a light source unit to reach a photosensitive drum in the form of spots are partially and identically reflected in a direction opposite to a beam scanning path to be incident to the light source unit, thereby inducing signal change within the light source unit and, at this time, detecting a synchronizing signal.

2. Description of the Prior Art

Generally, in optical scanning devices, as shown in FIG. 10, beams radiated from a light source unit 1 internally equipped with a laser diode are transformed into parallel beams which are in parallel with one another in a main scanning direction and a sub-scanning direction while passing through a collimator lens 2. The parallel beams pass through a slit member 2a having a hole elongated in the main scanning direction via a portion corresponding to the hole, and then converge in the sub-scanning direction on a cylindrical lens 2b.

The beams having converged in the sub-scanning direction are incident to a deflection unit 3 to be reflected thereafter in the state of having a regular angle of view by a polygon mirror 3a which is rotated at high speed, thereby outgoing toward a focal unit 4. Here, focal unit 4 is of a scanning system lens which may consist of a toric lens 4a and a focusing lens 4b for converging to make the incident beams outgoing to a photosensitive drum 5. Here, photosensitive drum 5 is provided with an interval for forming a focus image by the scanning beams, i.e., an effective scanning width 5a, and a detection unit 6 is furnished for generating a synchronizing signal that constantly synchronizes effective scanning width 5a.

Detection unit 6 serves by detecting the beams before or after effective scanning width 5a to generate the synchronizing signal, which is equipped with a reflection mirror 6a for reflecting some of the beams outgoing toward photosensitive drum 5 into the other direction. The beams reflected by reflection mirror 6a are the beams before or after effective scanning width 5a, which are converged in the main scanning direction during a procedure of passing through a beam detect lens 6b and are incident to a photodiode 6d after passing through a slit 6c having a small aperture. Photodiode 6d detects the synchronizing signal by means of the incident beams.

In association with the conventional optical scanning device constructed as above, the beams radiated from light source unit 1 are changed into the beams of which main scanning and sub scanning become in parallel while passing through collimator lens 2. Thereafter, the beams in the sub-scanning direction converge while passing through slit 2a and cylindrical lens 2b. The beams having converged in the sub-scanning direction scan photosensitive drum 5 under the state of having the regular angle of view at polygon mirror 3a. Also, the beams converge in the main scanning direction by focal unit 4 to be formed as the spots before scanning to photosensitive drum 5 and then are incident to photosensitive drum 5.

Detection unit 6 detects the beams before or after effective scanning width 5a of photosensitive drum 5 to generate the synchronizing signal. The beams reflected from polygon mirror 3a are reflected toward photodiode 6d by reflection mirror 6a before reaching effective scanning width 5a or passing through effective scanning width 5a of photosensitive drum 5. At this time, the beams converge while passing through cylindrical lens 6b and focused while passing through slit 6c prior to being incident to photodiode 6d. Then, photodiode 6d generates the synchronizing signal in accordance with the incident beams.

However, when considering the conventional detection unit, the beams before or after effective scanning width 5a are reflected by reflection mirror 6a, and the reflected beams are incident toward separately-provided photodiode 6d, so that the synchronizing signal is detected. Furthermore, cylindrical lens 6b and slit 6c should be employed for converging the beams incident toward photodiode 6d to have drawbacks of complicating the construction and increasing the number of parts. In addition to these, photodiode 6d, cylindrical lens 6b, slit 6c and the like are to be fixedly installed into the interior of the optical scanning device to make the device bulky to hinder fabrication of the optical scanning device having a small size.

SUMMARY OF THE INVENTION

The present invention is devised to solve the foregoing conventional problems. Therefore, it is an object of the present invention to provide an optical scanning device and a synchronizing signal detecting method thereof for simplifying the construction, wherein beams before or after an effective scanning width are identically reflected in an opposite direction of a scanning path upon being incident to a reflection unit to return to a light source unit via a focal unit and a deflection unit and signal change is induced within the light source unit upon the return of the beams, thereby allowing for detecting a synchronizing signal in accordance with the signal change.

To achieve the above object of the present invention, there is provided an optical scanning device which includes a light source unit having a laser diode for radiating beams and a photodiode for detecting the beams output, and a deflection unit for deflecting the beams outgoing from the light source unit by a regular angle of view. Also included as parts are a focal unit for converging the beams outgoing from the deflection unit and scanning them onto a photosensitive drum, and a detection unit for reflecting beams before or after an effective scanning width among the beams scanning the photosensitive drum in a direction opposite to a scanning path to supply them to the light source unit. In addition to these, a synchronizing signal generating part detects a synchronizing signal when the photodiode induces signal change by the beams reflected to the light source unit.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
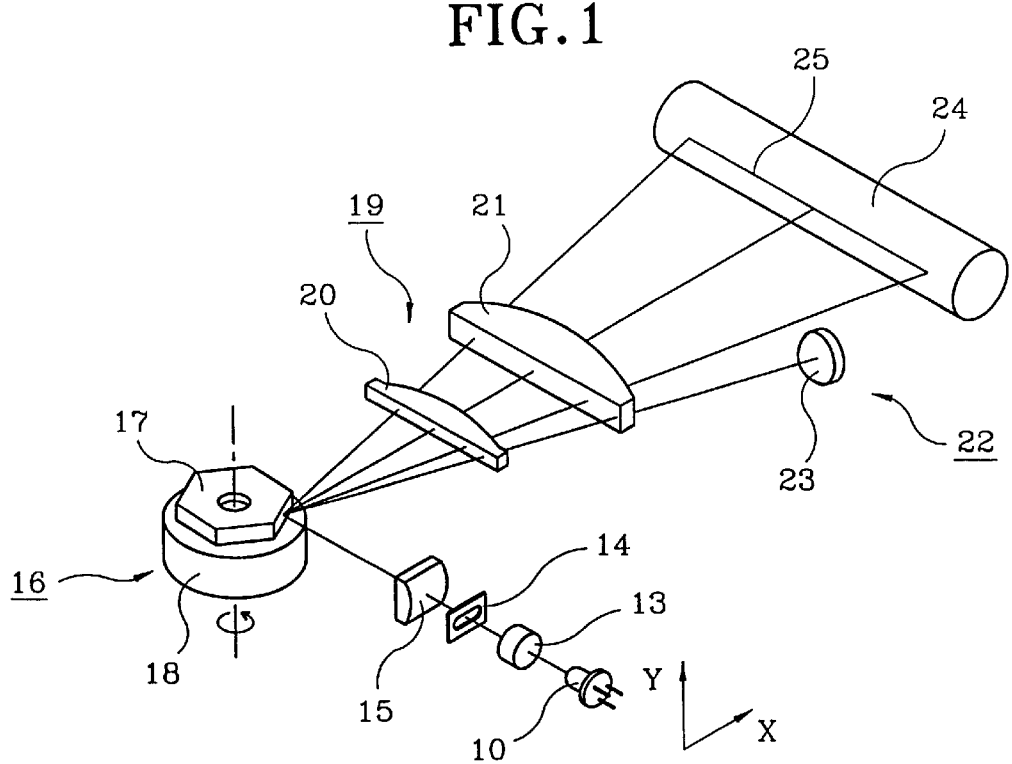
FIG. 1 is a perspective view showing a first embodiment of an optical scanning device according to the present invention.
Figure 2:
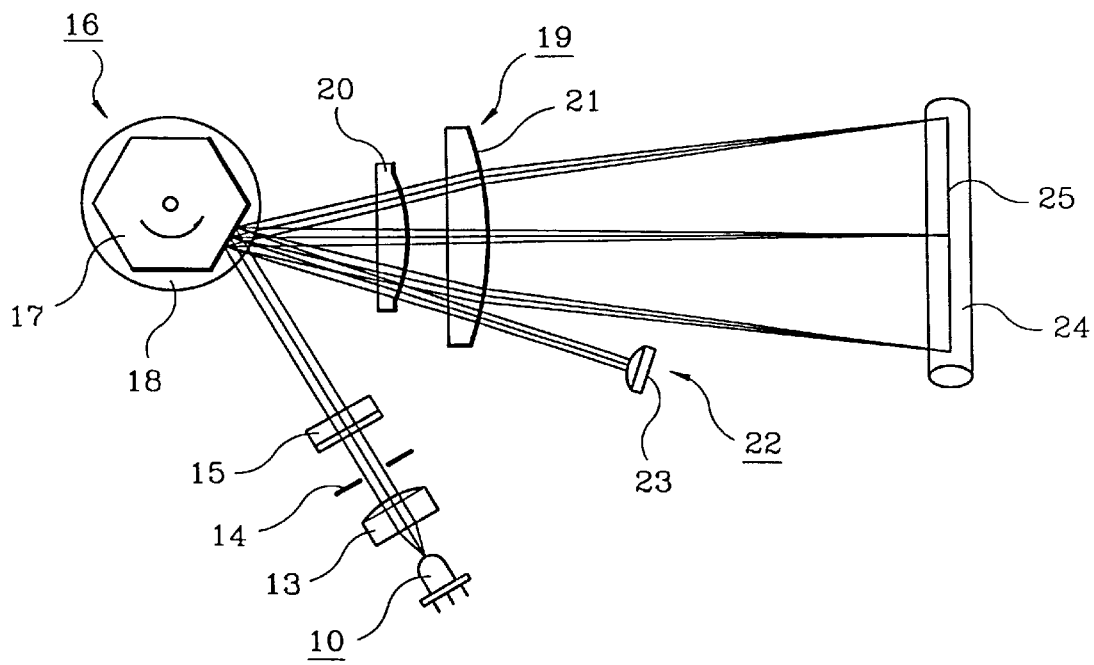
FIG. 2 is a plan view showing the first embodiment of the present invention.

FIG. 1 is a perspective view showing a first embodiment of an optical scanning device according to the present invention, and FIG. 2 which is a plan view thereof. Here, a light source unit 10 for radiating beams is provided, and the beams outgoing from light source unit 10 are transformed into parallel beams in a collimator lens 15. At this time, collimator lens 15 converts the beams in a main scanning direction along the X direction on the drawing and the beams in a sub-scanning direction along the Y direction on the drawing into the parallel beams. Also, a slit 14 having a hole elongated in the main scanning direction is installed into the frontal side of collimator lens 15. The parallel beams outgoing from collimator lens 15 are incident to slit 14, and some of them corresponding to the hole are outgoing through slit 14.

The beams having been outgoing through slit 14 scan toward a cylindrical lens 13 provided to the frontal side thereof. Cylindrical lens 13, once the elongately-shaped beams are incident in the main scanning direction, leads the incident beams to be outgoing by converging in the sub-scanning direction. The beams having been outgoing by converging in the sub-scanning direction have a regular width in the main scanning direction since they do not converge in the main scanning direction. The beams having converged in the sub-scanning direction scan while being deflected toward a photosensitive drum 24 within the range of a regular angle of view (of approximately 20°~45°). A deflection unit 16 is provided with a motor 18 and a polygon mirror 17 rotated at high speed by means of motor 18. Polygon mirror 17 consists of a polyhedron and respective planes are equipped with mirrors. Accordingly, the beams outgoing from cylindrical lens 13 are incident to polygon mirror 17 rotating at high speed and then are outgoing while being deflected within the range of regular angle of view.

The beams outgoing by being deflected pass through a focal unit 19 prior to scanning onto photosensitive drum 24. The beams which outgoes by being deflected converge in the sub-scanning direction but have a regular width in the main scanning direction. Accordingly, focal unit 19 converges the beams which having converged in the sub-scanning direction into the main scanning direction to allow for forming spots. Such focal unit 19 is of a scanning system lens which may consist of a toric lens 20 and a focusing lens 21, and is also known as a f·~ lens.

The beams converging in the main scanning direction while passing through focal unit 19 are outgoing to be incident to photosensitive drum 24, thereby forming the spots. The beams incident to photosensitive drum 24 has an effective scanning width 25 which forms an image in accordance with a video signal. A starting point of effective scanning width 25 is determined by a synchronizing signal. Additionally, a detection unit 22 for detecting the synchronizing signal is provided. Detection unit 22 functions by identically reflecting the beams before or after effective scanning width 25 among the beams outgoing from focal unit 19 in the direction opposite to the scanning path and by making the reflected beams finally return to light source unit 10. By the beams incident to light source unit 10, the signal change is induced within light source unit 10 to thereby detect the synchronizing signal.

Detection unit 22 is furnished with a reflection member 23 which identically reflects the beams before or after effective scanning width 25 in the opposite direction of the scanning path. Since the beams before or after effective scanning width 25 are incident to reflection member 23 under the state of converging in both the main scanning and sub-scanning directions while passing through focal unit 19, the reflecting plane thereof is constituted in the shape of a convex mirror for oppositely reflecting the beams identically. The beams reflected from reflection member 23 is reflected in the opposite direction of the scanning path to be outgoing toward focal unit 19 and polygon mirror 17. Then, the beams incident to polygon mirror 17 are incident to light source unit 10 via cylindrical lens 13, slit 14 and collimator lens 15.

Figure 3:
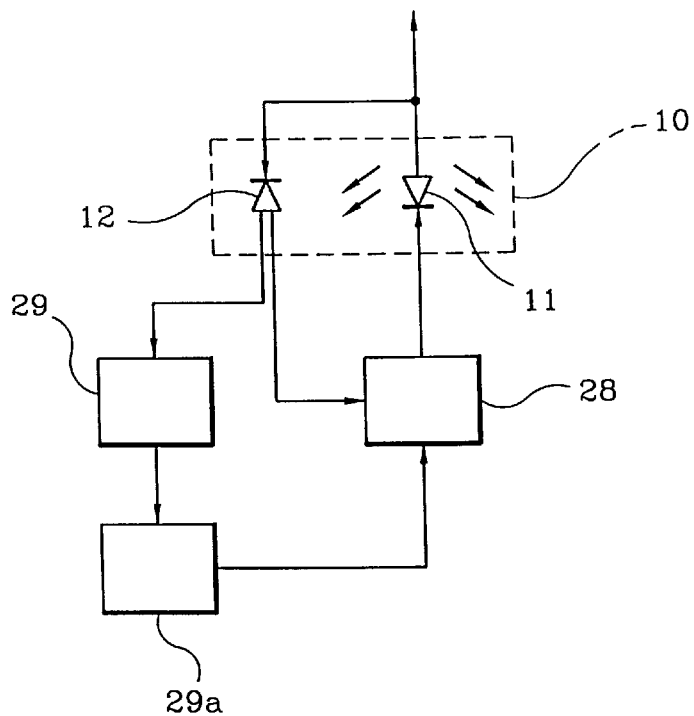
FIG. 3 is block diagram showing the light source unit according to the first embodiment of the present invention.

FIG. 3 is block diagram showing the light source unit according to the first embodiment of the present invention. Light source unit 10 is provided with a laser diode 11 for radiating the beams, and a beam output controlling part 28 is installed for applying a voltage to laser diode 11. A photodiode 12 is furnished for detecting the beams outgoing from laser diode 11. The beams detected by photodiode 12 are compared to be analyzed in beam output controlling part 28, so that the beams radiated from laser diode 11 are controlled to be constant. By this construction, the beams before or after effective scanning width 25 are reflected in the opposite direction of the scanning path once having been incident toward reflection member 23 to be incident toward photodiode 12 of light source unit 10. In photodiode 12, the signal change is incited by the reflected beams and the signal change serves as the synchronizing signal.

The signal change of photodiode 12, i.e., synchronizing signal, is detected in a synchronizing signal generating part 29. Upon the output of the synchronizing signal, a video signal generating part 29a supplies a video signal toward beam output controlling part 28 in accordance with the synchronizing signal. Beam output controlling part 28 provides the beams in accordance with the supplied video signal to form an image (one line print) onto effective scanning width 25.

Figure 4:
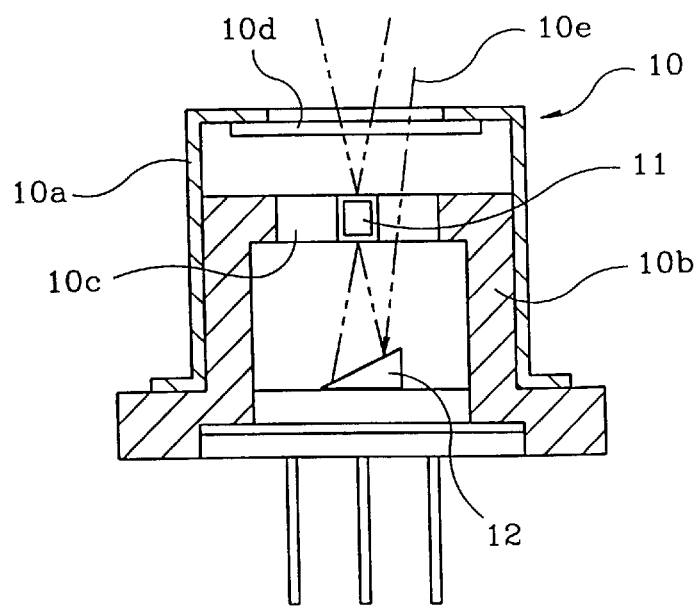
FIG. 4 is a sectional view showing the light source unit according to the first embodiment of the present invention.

FIG. 4 is a sectional view showing the light source unit according to the first embodiment of the present invention. Light source unit 10 is installed with a cylindrical main body 10a, and a heat sink 10b having a hole 10c into the upper portion thereof within the inside of main body 10a. Laser diode 11 is installed to the upper central portion of heat sink 10b to be adjacent to hole 10c, so that heat produced during the beam output procedure from laser diode 11 is discharged from heat sink 10b. Additionally, photodiode 12 is provided to the directly lower portion of laser diode 11 for detecting the beams. A lens 10d is installed to the upper portion of main body 10a for outgoing the beams radiated from laser diode 11.

In connection with light source unit 10 according to the present invention formed as above, once being radiated from laser diode 11 installed to the inside of main body 10a, the beams are outgoing in the scanning direction via lens 10d. The heat produced during operating laser diode 11 is discharged through heat sink 10b to maintain the stable beam output. Some of the beams radiated from laser diode 11 are outgoing toward photodiode 12 provided to the lower portion thereof. Thus, photodiode 12 detects the beams to stabilize the output of laser diode 11. A reflected beams 10e reflected by reflection member 23 is incident toward photodiode 12 via lens 10d and hole 10c. At this time, the signal change is induced and the synchronizing signal is detected in synchronizing signal generating part 29.

According to the aforementioned present invention formed as above, when the voltage of beam output controlling part 28 is applied to laser diode 11 of light source unit 10, the beams are provided to be outgoing into the scanning path. The outgoing beams are changed into the parallel beams having the parallelled main scanning and sub-scanning while passing through collimator lens 15 to be outgoing toward cylindrical lens 13. Cylindrical lens 13 converges the incident beams in the sub-scanning direction, and the beams having converged in the sub-scanning direction go to the state of having the regular width in the main scanning direction while passing through slit 14. The beams having the regular width in the main scanning direction after having converged in the sub-scanning direction are to be outgoing to deflection unit 16, and are then deflected in the state of having the regular angle of view by polygon mirror 17 which is rotated at high speed by motor 18.

The beams deflected in polygon mirror 17 pass through focal unit 19 prior to scanning photosensitive drum 24. Focal unit 19 functions for converging the beams having converged in the sub-scanning direction into the main scanning direction, by which the beams having passed through focal unit 19 form the spots by focusing upon scanning over photosensitive drum 24. The beams scanning over photosensitive drum 24 has effective scanning width 25 formed with the image by means of the video signal. Effective scanning width 25 is determined after the synchronizing signal, and the synchronizing signal is detected by detection unit 22 of the present invention.

Once the beams having passed through focal unit 19 are outgoing to photosensitive drum 24, they are incident to reflection member 23 of detection unit 22 before or after effective scanning width 25 to be reflected in the opposite direction of the scanning path. When the beams reflected in the opposite direction of the scanning path are finally incident to light source unit 10, photodiode 12 formed therein incites the signal change. Photodiode 12 is for detecting the beams radiated from laser diode 11, and the output of beam output controlling part 28 is controlled in accordance with the detected signal. If the beams reflected from reflection member 23 are incident to light source unit 10 during the procedure of detecting the beams of laser diode 11 by photodiode 12, the reflected beams and the beams radiated from laser diode 11 are simultaneously detected to induce the signal change.

The signal change incited in photodiode 12 is sensed by synchronizing signal generating part 29 which recognizes the signal change in photodiode 12 as the synchronizing signal, thus detecting the synchronizing signal. When the synchronizing signal is detected in synchronizing signal generating part 29 to be received into video signal generating part 29a, the video signal is provided after the synchronizing signal. The video signal output is supplied into beam output controlling part 28, and the beams are provided from beam output controlling part 28 in accordance with the video signal to be outgoing to photosensitive drum 24 along the scanning path. The beams output in accordance with the video signal are outgoing to effective scanning width 25 to be focused to form the image.

Figure 5:
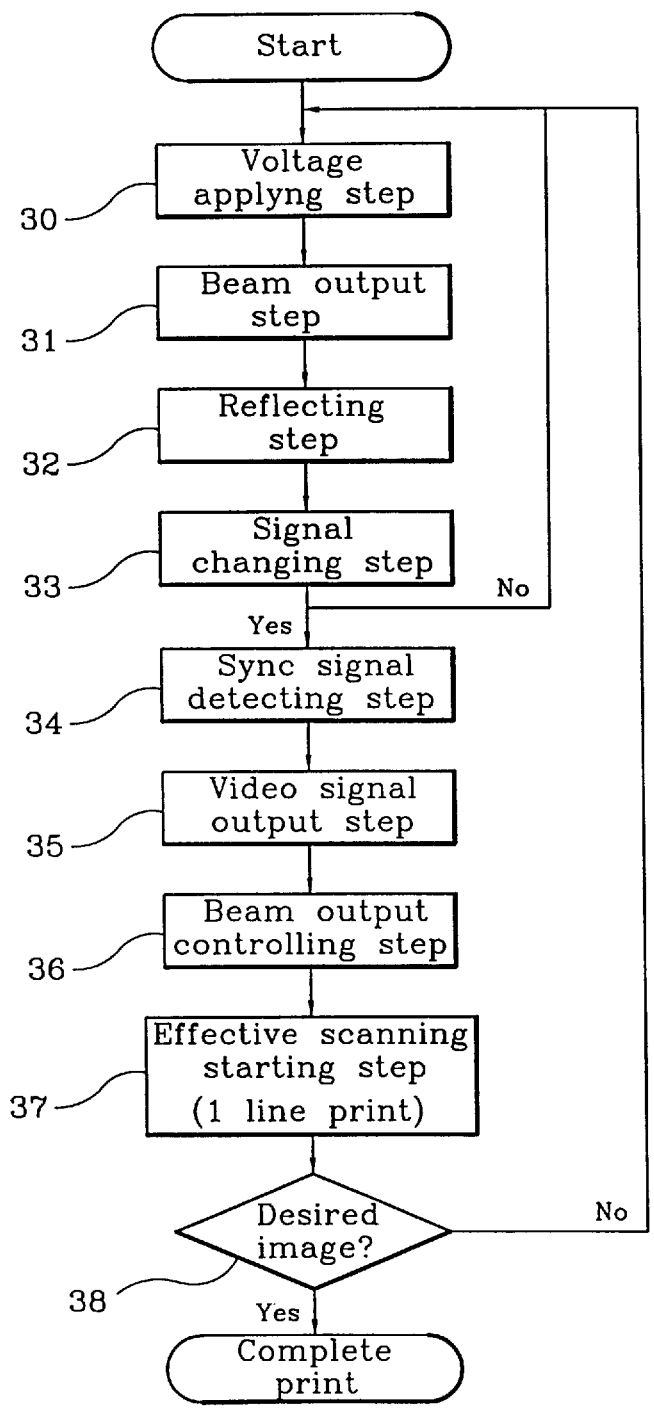
FIG. 5 is a diagrammatic view representing a synchronizing signal detecting method according to the first embodiment of the present invention.

FIG. 5 is a diagrammatic view representing a synchronizing signal detecting method according to the first embodiment of the present invention. The synchronizing signal detecting method according to the present invention is carried out in the sequence of a voltage applying step 30 for applying the voltage from beam output controlling part 28 to light source unit 10, and a beam output step 31 for providing the beams from light source unit 10 in accordance with the voltage applied from voltage applying step 30. Successively, in a reflecting step 32, the beams before or after effective scanning width 25 are reflected to light source unit 10 when the beams outgoing from beam output step 31 is deflected with passing through deflection unit 16. Thereafter, once the beams reflected in reflecting step 32 is incident to light source unit 10, a signal changing step 33 is executed for inducing the signal change by photodiode 12 which forms light source unit 10.

Following to these, when the signal of photodiode 12 is changed in signal changing step 33, the changed signal is recognized as the synchronizing signal in synchronizing signal generating part 29 to constitute a synchronizing signal detecting step 34. Then, in a video signal output step 35, the video signal is provided from video signal generating part 29a after the synchronizing signal upon the detection of the synchronizing signal in synchronizing signal detecting step 34. A beam output controlling step 36 controls the beam output from beam output controlling part 28 in accordance with the video signal output, and an effective scanning starting step 37 is performed such that the beams provided in accordance with the video signal in beam output controlling step 36 scan effective scanning width 25 of photosensitive drum 24 to be focused as the image. Further to these steps, the method includes an image finishing step 38 for continuing the effective scanning until the desired image is obtained.

Figure 6:
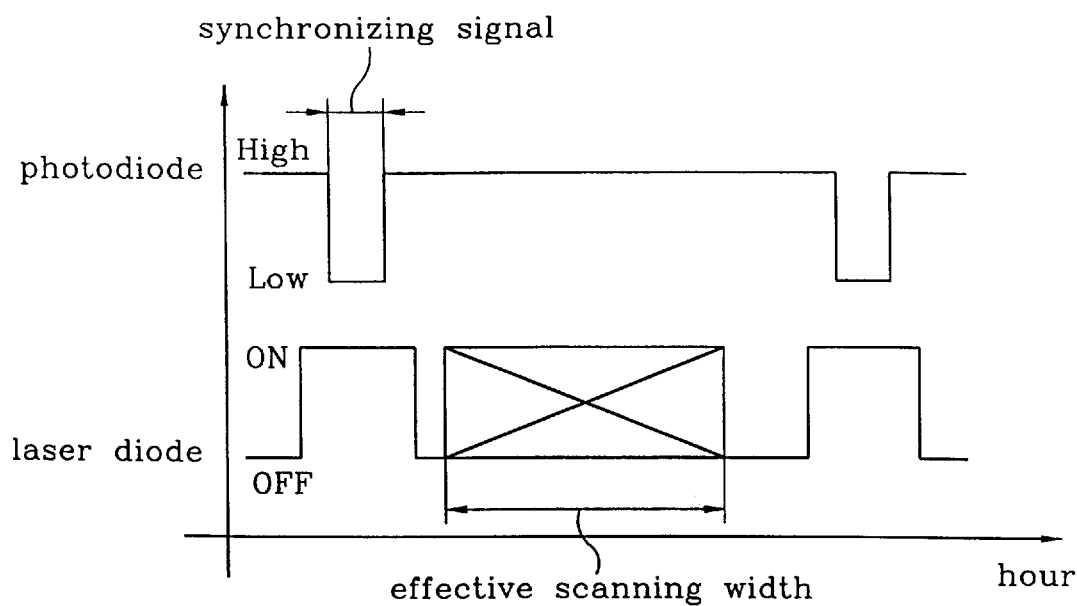
FIG. 6 is a timing chart of the synchronizing signal according to the present invention.

FIG. 6 is a timing chart of the synchronizing signal according to the present invention. Referring to FIG. 6, when the voltage is applied from beam output controlling part 28 to laser diode 11, the beams are radiated and photodiode 12 senses the beam output to supply a high signal High toward beam output controlling part 28. Then, beam output controlling part 28 controls the beam output in accordance with the high signal, and the output beams are outgoing along the scanning path. If the beams before or after effective scanning width 25 among the beams outgoing along the scanning path are reflected by reflection member 23 to be reflected in the opposite direction of the scanning path, the beams are incident to light source unit 10, and photodiode 12 involves the signal change to generate a low signal Low.

The low signal produced from photodiode 12 is received into synchronizing signal generating part 29, which recognizes the low signal as the synchronizing signal H-Sync. Video signal generating part 29a provides the video signal by delaying a predetermined time difference (of approximately 1 $\mu$sec) after the synchronizing signal. The video signal output is supplied toward beam output controlling part 28, and the beam output is controlled in accordance with the video signal. Consequently, the video signal is supplied toward beam output controlling part 28 after the synchronizing signal, and the beams provided in accordance with the video signal scan effective scanning width 25 to form the image (1 line print) by the focusing.

Figure 7:
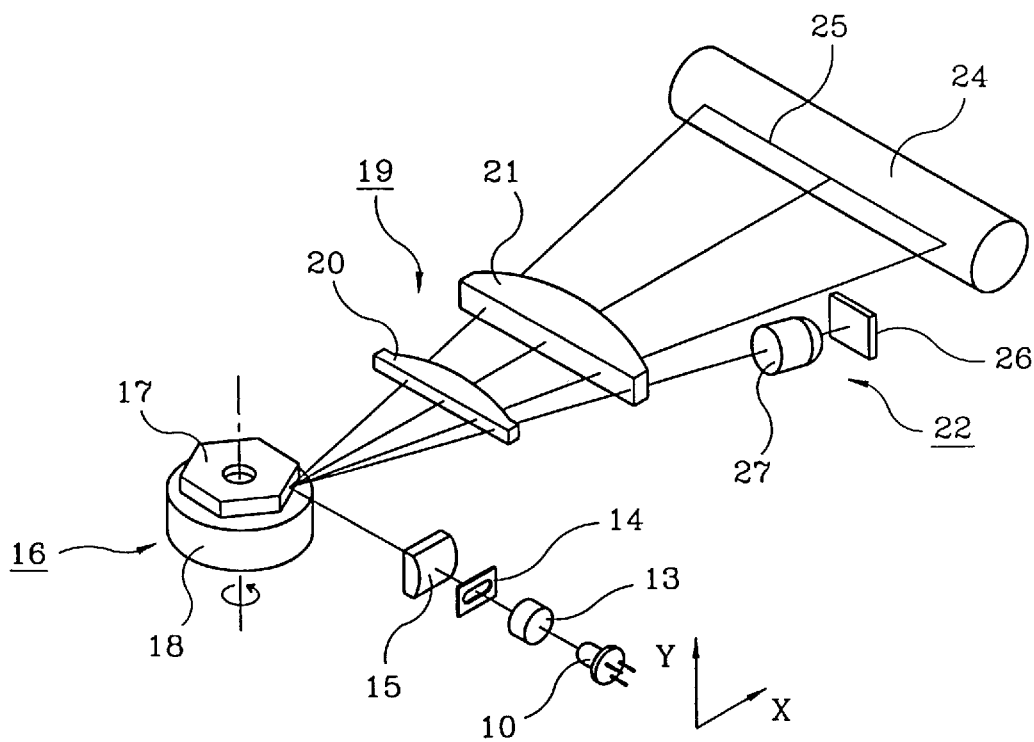
FIG. 7 is a perspective view showing a second embodiment of the optical scanning device according to the present invention.
Figure 8:
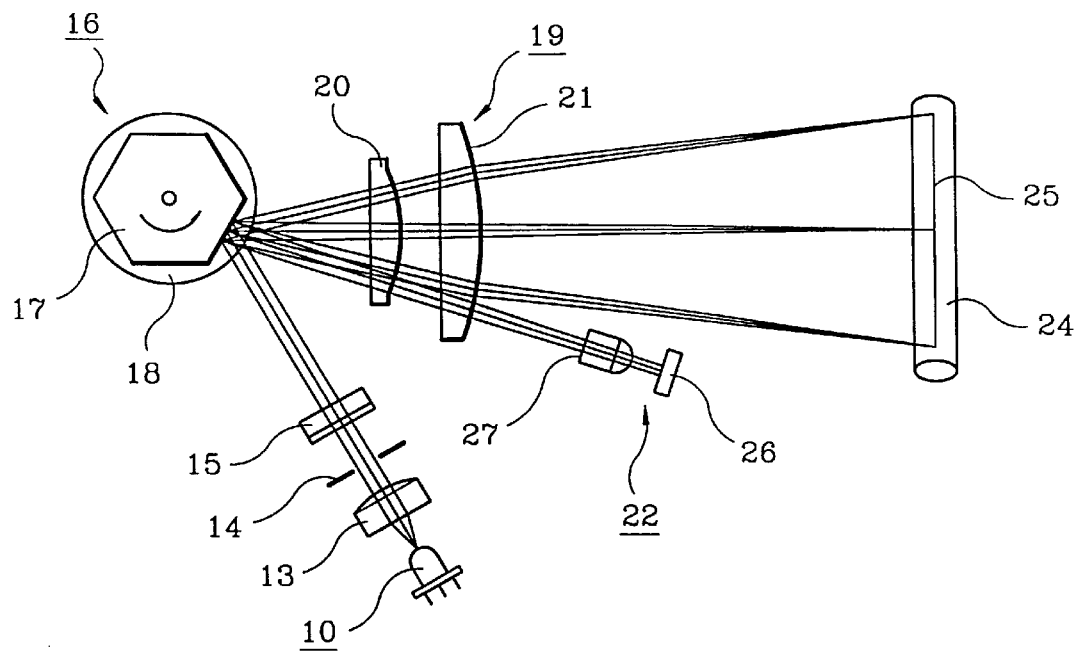
FIG. 8 is a plan view showing the second embodiment of the present invention.

FIG. 7 is a perspective view showing a second embodiment of the present invention, and FIG. 8 is a plan view showing the second embodiment of the present invention. As described hereinafter, the same parts as those of the first embodiment of the present invention are indicated by the same reference numerals. Distinctively, the second embodiment of the present invention is provided with a detection unit 22 for reflecting the beams before or after effective scanning width 25 to detect the synchronizing signal. Detection unit 22 is equipped with a reflection member 26 for reflecting the beams before or after effective scanning width 25 in the opposite direction of the scanning path, and a collimator lens 27 for converting the beams incident to the frontal side of reflection member 26 into the parallel beams. Reflection member 26 is constituted in the shape of a plain mirror which reflects the parallel beams having passed through collimator lens 27 into the opposite direction of the scanning path in parallel.

In view of the second embodiment of the present invention constructed as above, the beams having passed through focal unit 19 converge in the main scanning and sub-scanning direction prior to outgoing to reflection member 26. Also, before outgoing to reflection member 26, the beams are transferred into the parallel beams of which main scanning and sub-scanning are in parallel with each other while passing through collimator lens 27. Since reflection member 26 is shaped as the plain mirror, the incident parallel beams are identically reflected in the opposite direction of the scanning path to be reflected to light source unit 10 via collimator lens 27, focal unit 19 and deflection unit 16. The beams reflected to light source unit 10 affects the signal of photodiode 12. Thus, the synchronizing signal is detected upon the input of the signal change into synchronizing signal generating part 29. The second embodiment of the present invention employs collimator lens 27 and reflection member 26 shaped as the plain mirror for reflecting the beams having converged in the main scanning and sub-scanning directions into the opposite direction of the scanning path. The collimator lens and plain mirror are conveniently manufactured to enhance productivity.

According to the present invention as described hereinbefore, the beams before or after the effective scanning width once being incident to the reflection unit are identically reflected in the opposite direction of the scanning path to be incident to the light source unit. At this time, the light source unit is formed by the laser diode for radiating the beams and the photodiode for detecting the beams output, and the beams reflected to the inside of the light source unit change the signal of the photodiode. When this signal change is received into the synchronizing signal generating part, the synchronizing signal is detected. For this operation, the present invention employs the combination of the plain mirror and collimator lens or the reflection member shaped as the convex mirror to detect the synchronizing signal, thereby being effective in simplifying the structure, enhancing the productivity, etc.

Figure 9:
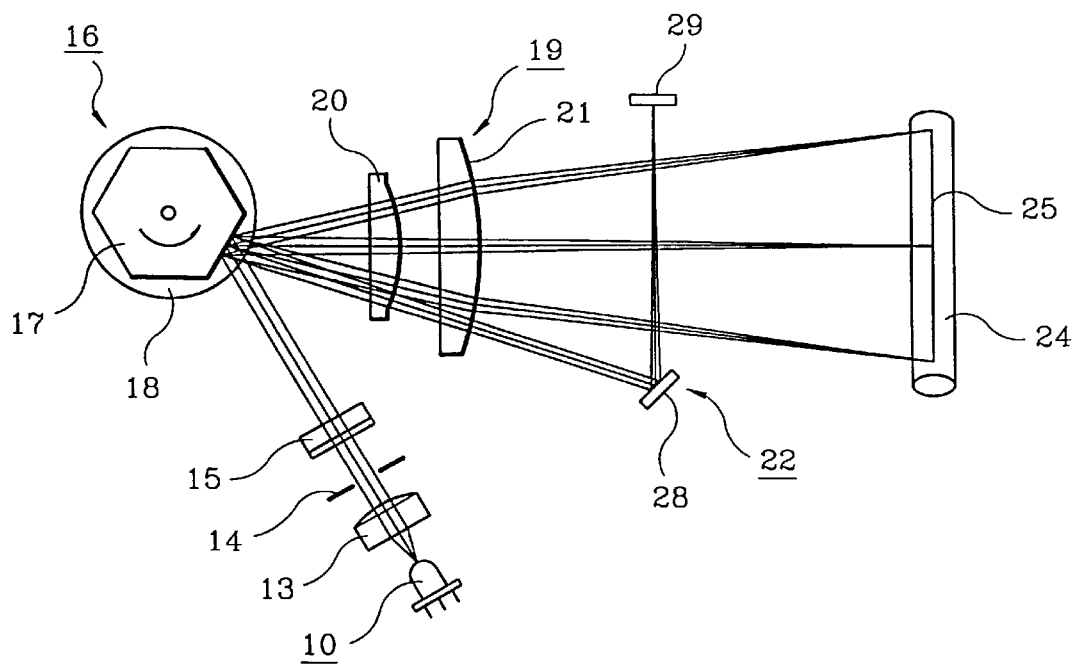
FIG. 9 is a plan view showing the third embodiment of the present invention.
Figure 10:
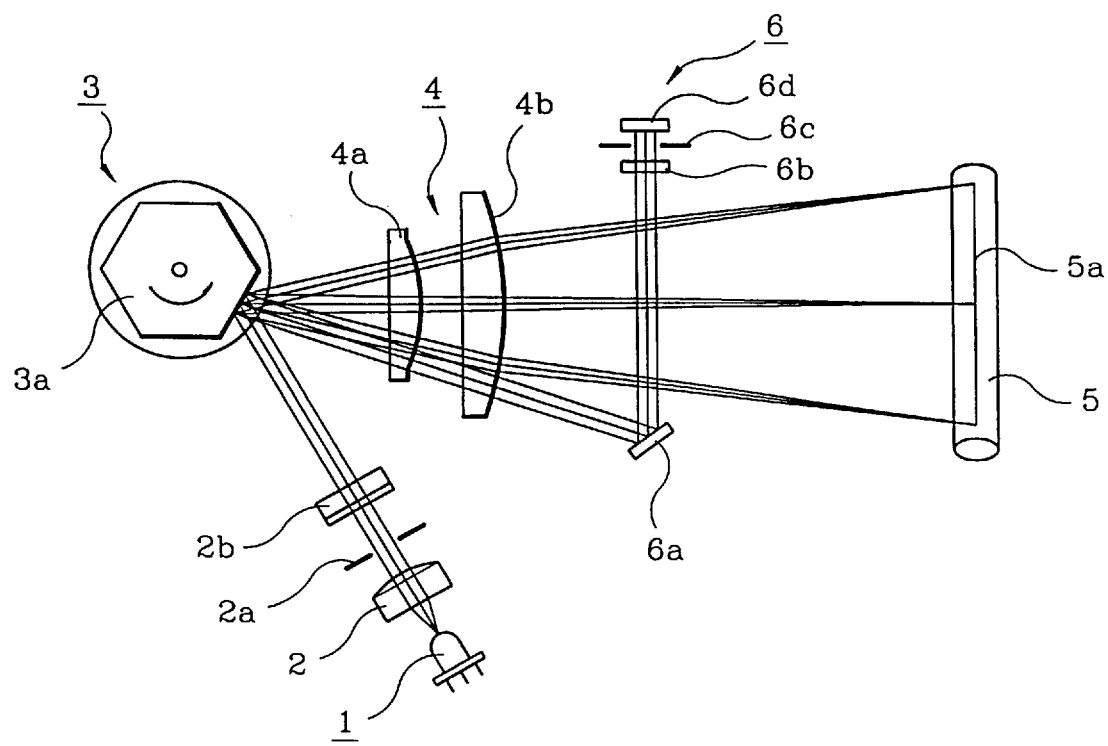
FIG. 10 is a plan view showing a conventional optical scanning device.

FIG. 9 is a plan view showing a third embodiment of the present invention, in which like parts corresponding to those of the first embodiment of the present invention are indicated by the same reference numerals. In the third embodiment of the present invention, a detection unit 22 is provided for reflecting the beams before or after effective scanning width 25 to detect the synchronizing signal. Detection unit 22 is equipped with a first plain mirror 28 for deflecting the beams before or after effective scanning width 25 into the direction different from the scanning path and a second plain mirror 29 at which the deflected beams are focused.

According to the third embodiment of the present invention formed as above, the beams having passed through focal unit 19 converge in the main scanning and sub-scanning direction prior to outgoing to first plain mirror 28. Also, when the beams deflected by first plain mirror 28 are incident to second plain mirror 29 which is installed where the deflected beams are focused, the beams are identically reflected in the opposite direction of the scanning path.

That is, the beams incident to second plain mirror 29 are reflected to light source unit 10 via first plain mirror 28, collimator lens 27, focal unit 19 and deflection unit 16. The beams reflected to light source unit 10 affects the signal of photodiode 12. Thus, the synchronizing signal is detected upon the input of the signal change into synchronizing signal generating part 29. In order to reflect the beams, the third embodiment of the present invention employs first and second plain mirrors 28 and 29 to simplify the construction, and detection unit 22 has the form of the plain mirrors to be advantageous of being easily manufactured.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical scanning device comprising:

light source means having a laser diode for radiating beams and a photodiode for detecting an output of said beams;

deflection means for deflecting said beams outgoing from said light source means by a regular angle of view;

focal means for converging said beams outgoing from said deflection means and scanning them onto a photosensitive drum;

detection means for reflecting beams before or after an effective scanning width among said beams scanning said photosensitive drum in a direction opposite to a scanning path to supply them to said light source means; and a synchronizing signal generating part for detecting a synchronizing signal when said photodiode induces signal change by said beams reflected to said light source means.

2. An optical scanning device as claimed in claim 1, wherein said detection means comprises a reflection member in the shape of a convex mirror.

3. An optical scanning device as claimed in claim 1, wherein said detection means comprises a reflection member in the shape of a plain mirror and a collimator lens for converting said beams incident toward said reflection member into parallel beams.

4. An optical scanning device as claimed in claim 1, wherein said detection means comprises a first plain mirror for deflecting said beams before or after said effective scanning width in a direction different from said scanning path, and a second plain mirror installed to a portion of focusing said beams deflected by said first plain mirror for reflecting said beams to said light source means.

5. A synchronizing signal detecting method of an optical scanning device comprising:

a voltage applying step of applying a voltage from a beam output controlling part to a laser diode within light source means;

a beam output step of providing beams from said laser diode;

a reflecting step of reflecting beams before or after an effective scanning width in an opposite direction of a scanning path to said light source means by detection means when said beams provided in said beam output step scan a photosensitive drum along said scanning path;

a signal changing step of inducing signal change in a photodiode within said light source means by means of said beams reflected from said detection means;

a synchronizing signal detecting step of detecting a synchronizing signal when said signal change of said photodiode is received into a synchronizing signal generating part;

a video signal output step of providing a video signal to said beam output controlling part after said synchronizing signal is received into a video signal generating part from said synchronizing signal generating part;

a beam output controlling step of controlling the beam output by said beam output controlling part in accordance with said video signal received from said video signal generating part;

an effective scanning starting step of scanning said beams provided in accordance with said video signal over said effective scanning width of said photosensitive drum to focus said beams as an image; and an image finishing step of continuing the effective scanning until a desired image is obtained.

* * * * *